(12) United States Patent
Glugla et al.

(10) Patent No.: US 9,297,331 B2
(45) Date of Patent: Mar. 29, 2016

(54) SYSTEM AND METHOD FOR OPERATING A DIRECT INJECTION FUEL PUMP

(71) Applicant: Ford Global Technologies, LLC, Dearborn, MI (US)

(72) Inventors: Chris Paul Glugla, Macomb, MI (US); Jeffrey Allen Doering, Canton, MI (US); Ken Jahr, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 13/890,660

(22) Filed: May 9, 2013

(65) Prior Publication Data

US 2014/0331975 A1 Nov. 13, 2014

(51) Int. Cl.
| F02D 41/38 | (2006.01) |
| F02D 41/40 | (2006.01) |
| F02M 59/10 | (2006.01) |
| F04B 1/04 | (2006.01) |
| F04B 9/04 | (2006.01) |
| F04B 53/00 | (2006.01) |
| F02D 1/10 | (2006.01) |
| F02M 59/30 | (2006.01) |
| F02M 59/20 | (2006.01) |
| F02M 39/02 | (2006.01) |
| F02D 1/18 | (2006.01) |

(Continued)

(52) U.S. Cl.
CPC .......... *F02D 41/3845* (2013.01); *F02D 41/406* (2013.01); *F02M 59/102* (2013.01); *F04B 1/0413* (2013.01); *F04B 9/042* (2013.01); *F04B 53/006* (2013.01); *F02D 1/10* (2013.01); *F02D 2001/186* (2013.01); *F02M 39/02* (2013.01); *F02M 59/20* (2013.01); *F02M 59/30* (2013.01); *F02M 63/029* (2013.01); *F02M 69/044* (2013.01); *F02M 69/046* (2013.01); *Y02T 10/44* (2013.01)

(58) Field of Classification Search
CPC . F02D 41/3845; F02D 1/10; F02D 2001/186; F02M 39/02; F02M 59/10; F02M 59/102; F02M 59/20; F02M 59/30; F01L 13/0036; F01L 13/0042; F01L 2013/0052
USPC ............................... 123/90.18, 496, 504, 508
See application file for complete search history.

(56) References Cited

U.S. PATENT DOCUMENTS

| 2,157,034 | A | * | 5/1939 | Tice | ........................ F02M 61/00 123/184.38 |
| 4,666,374 | A | * | 5/1987 | Nelson | ................ F04B 11/0058 417/3 |
| 6,546,917 | B2 | * | 4/2003 | Onishi | ................... F02M 55/04 123/496 |

(Continued)

OTHER PUBLICATIONS

Glugla, Chris Paul, et al., "Position Detection for Lobe Switching Camshaft System," U.S. Appl. No. 61/808,873, filed Apr. 5, 2013, 36 pages.

*Primary Examiner* — Stephen K Cronin
*Assistant Examiner* — Kevin R Steckbauer
(74) *Attorney, Agent, or Firm* — Julia Voutyras; Alleman Hall McCoy Russell & Tuttle LLP (57) ABSTRACT

Methods and systems are provided for a direct injection fuel pump. The methods and systems selectively operate the direct injection fuel pump with varying levels of efficiency. In one example, an amount of piston lift of a direct fuel injection pump may be adjusted to selectively alter the pump's operating efficiency.

9 Claims, 6 Drawing Sheets

(51) Int. Cl.
*F02M 63/02* (2006.01)
*F02M 69/04* (2006.01)

(56) References Cited

U.S. PATENT DOCUMENTS

| | | | | |
|---|---|---|---|---|
| 6,973,921 B2 * | 12/2005 | Shafer et al. | ................... | 123/495 |
| 7,753,032 B2 * | 7/2010 | Iihoshi | ................ F02D 13/0207 | 123/457 |
| 7,770,562 B2 * | 8/2010 | Pursifull | ............ F02M 37/0088 | 123/446 |
| 7,802,562 B2 * | 9/2010 | Lippa | ................. F02D 19/0684 | 123/1 A |
| 7,845,334 B2 * | 12/2010 | Lippa | ................. F02D 19/0684 | 123/431 |
| 8,550,058 B2 * | 10/2013 | Pursifull | ............ F02M 63/0225 | 123/1 A |
| 8,590,510 B2 * | 11/2013 | Surnilla | ................. F02M 39/02 | 123/431 |
| 8,601,863 B2 * | 12/2013 | Nishigaki | ............. F02D 41/221 | 73/114.45 |
| 2002/0096145 A1 * | 7/2002 | Ricco | ...................... F02D 41/38 | 123/446 |
| 2009/0159057 A1 * | 6/2009 | Pursifull | ............ F02M 63/0225 | 123/575 |
| 2010/0024771 A1 * | 2/2010 | Bidner | ................ F02D 19/0605 | 123/446 |
| 2012/0048242 A1 * | 3/2012 | Surnilla | ................. F02M 39/02 | 123/497 |
| 2013/0228039 A1 * | 9/2013 | Nendel | ................ F01L 13/0036 | 74/568 R |

* cited by examiner

PRIOR ART

SYSTEM AND METHOD FOR OPERATING A DIRECT INJECTION FUEL PUMP

BACKGROUND AND SUMMARY

Directly injecting fuel into an engine cylinder may improve some engine operation in ways that injecting fuel into a cylinder's intake port does not improve engine operation. Likewise, injecting fuel into a cylinder's intake port may improve engine operation in ways that directly injecting fuel into an engine cylinder does not improve engine operation. For example, during lower engine loads, port fuel injection may be preferred over direct fuel injection because port fuel injectors are quieter than direct fuel injectors. On the other hand, direct fuel injectors may be operated at higher engine loads to reduce the possibility of engine knock since directly injecting fuel into a cylinder cools the cylinder charge via fuel vaporization. Advantages of port fuel injection and direct fuel injection maybe realized by incorporating port and direct fuel injection into an engine. However, during conditions where the direct fuel injectors are deactivated, the direct injection fuel pump may continue to operate such that engine fuel economy is less than is desired.

The inventors herein have recognized the above-mentioned issue may be at least partly addressed by a method of operating a direct injection fuel pump, comprising: during a first condition, operating a direct injection fuel pump with a first piston lift amount; and during a second condition, the second condition different from the first condition, operating the direct injection fuel pump with a second piston lift amount, the second piston lift amount greater than the first piston lift amount.

By operating a direct injection fuel pump with varying lift amounts, it may be possible to deactivate the direct injection fuel pump and use less energy in doing so. For example, the direct injection fuel pump may transition from a low lift cam profile to zero lift cam profile to deactivate the direct injection fuel pump. The fuel pump piston may remain stationary when operated with a zero lift cam profile. Therefore, the direct injection fuel pump is not consuming energy by compressing fuel in the direct injection fuel pump's compression chamber. Additionally, since the piston is stationary and not reciprocating, the direct injection fuel pump may not require lubrication.

The present description may provide several advantages. For example, the approach may reduce fuel consumption of an engine. Additionally, the approach may be applied using a compact mechanism. Further, the approach may allow the engine to rotate without providing lubrication to the direct fuel injection pump piston and pumping chamber.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
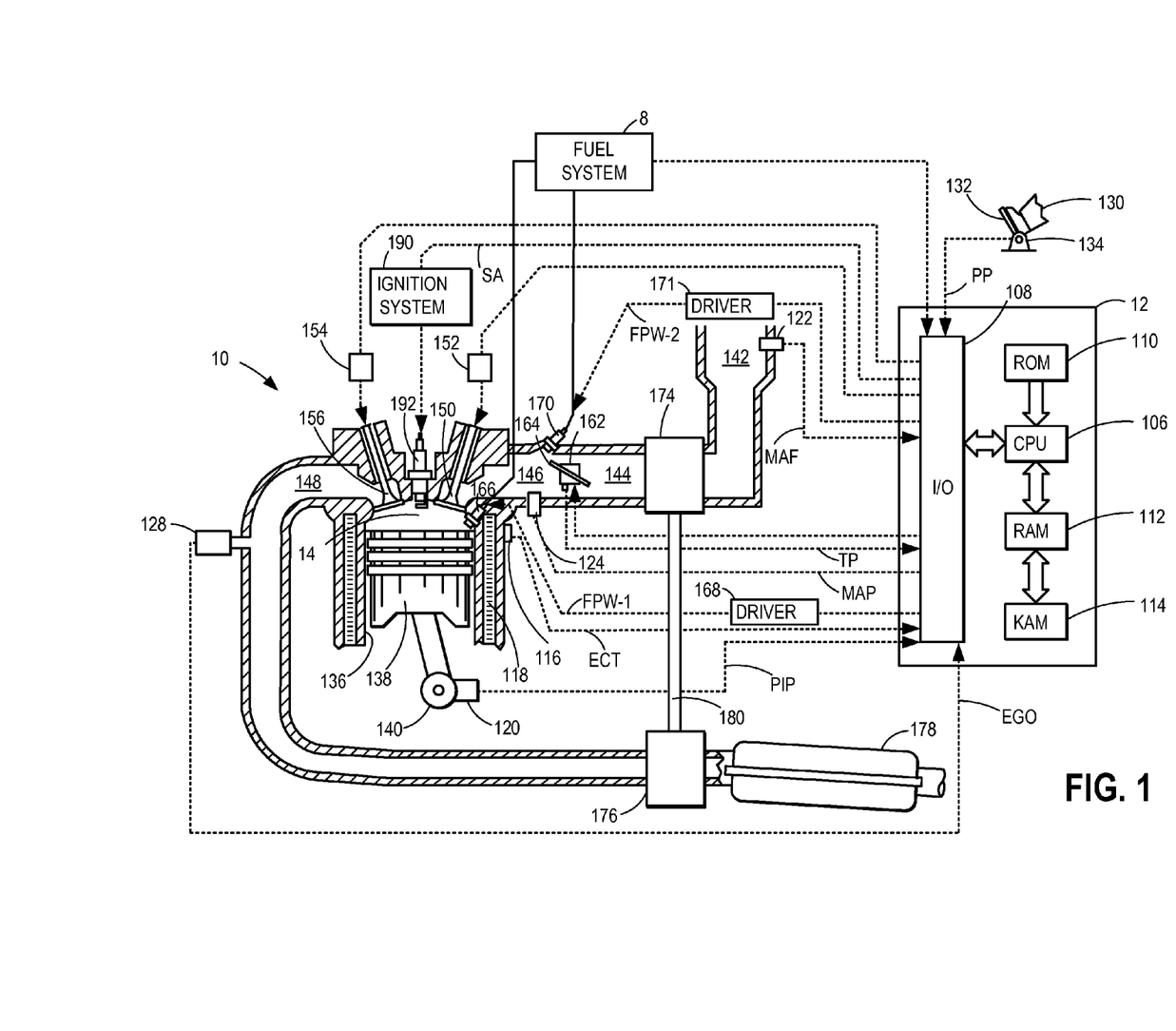
FIG. 1 shows an example of a cylinder of an internal combustion engine.
Figure 2:
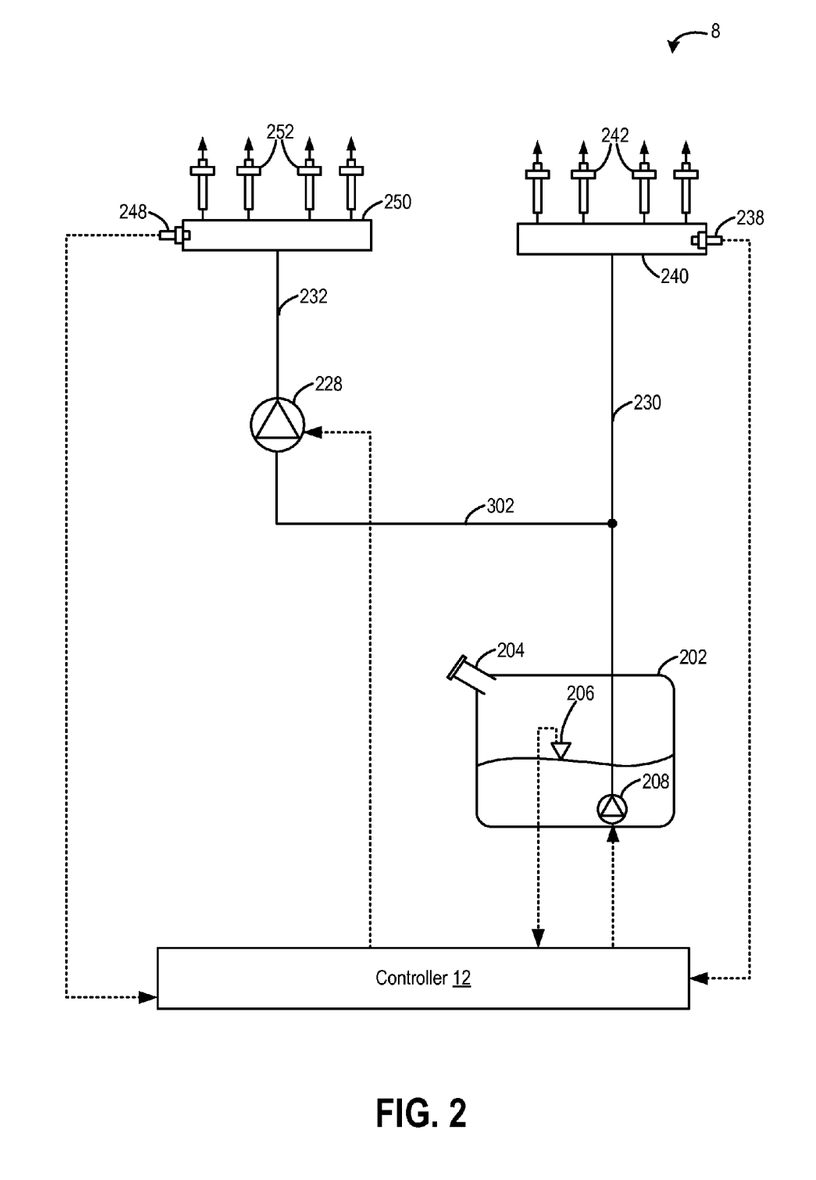
FIG. 2 shows an example of a fuel system that may be used with the engine of FIG. 1.
Figure 3:
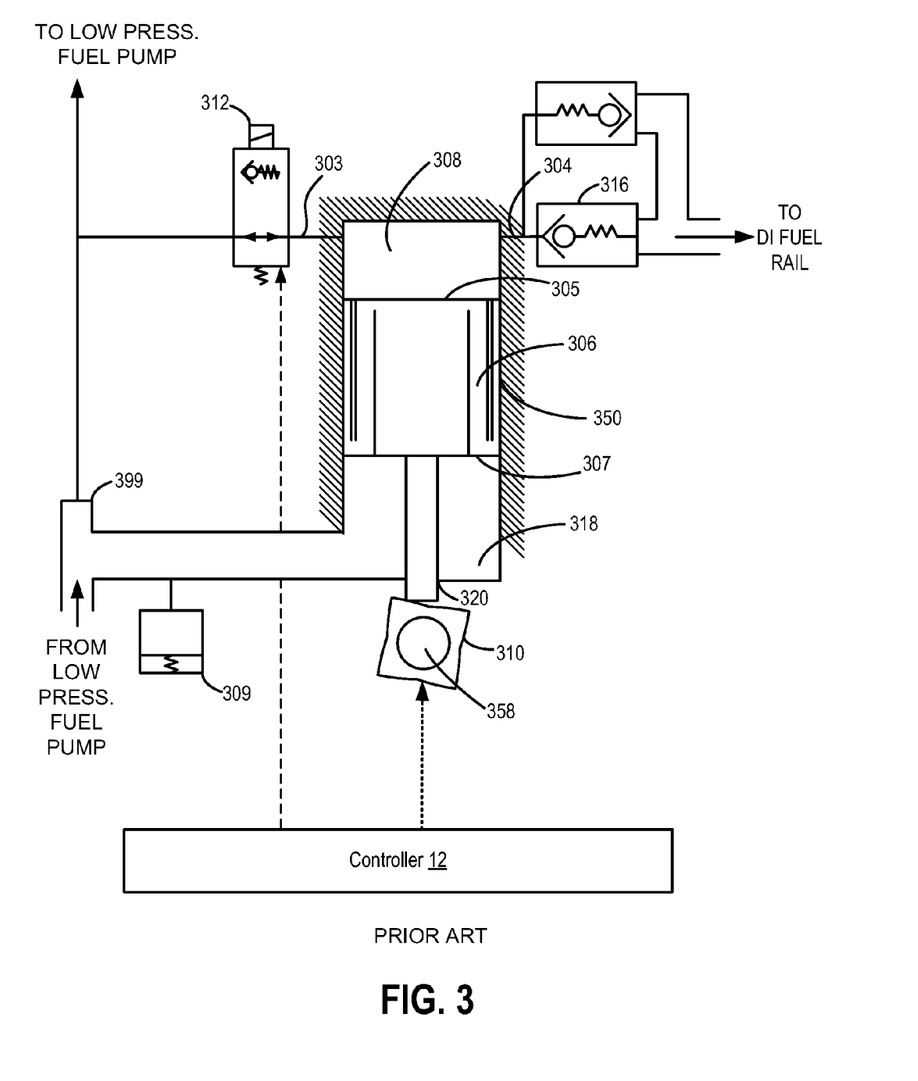
FIG. 3 shows an example prior art high pressure direct injection fuel pump.
Figure 4:
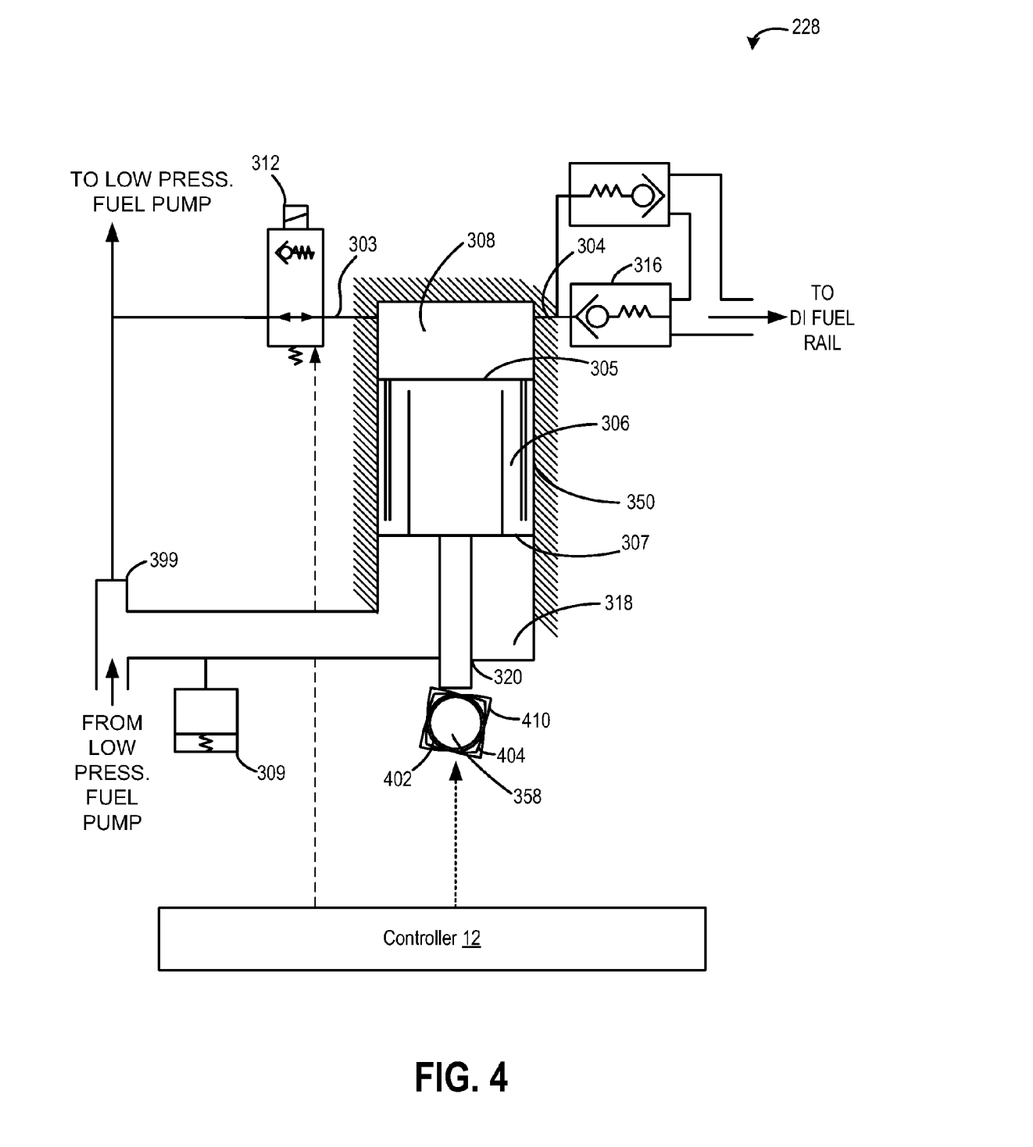
FIG. 4 shows example high pressure direct injection fuel pump of the fuel system in FIG. 2.
Figure 5A:
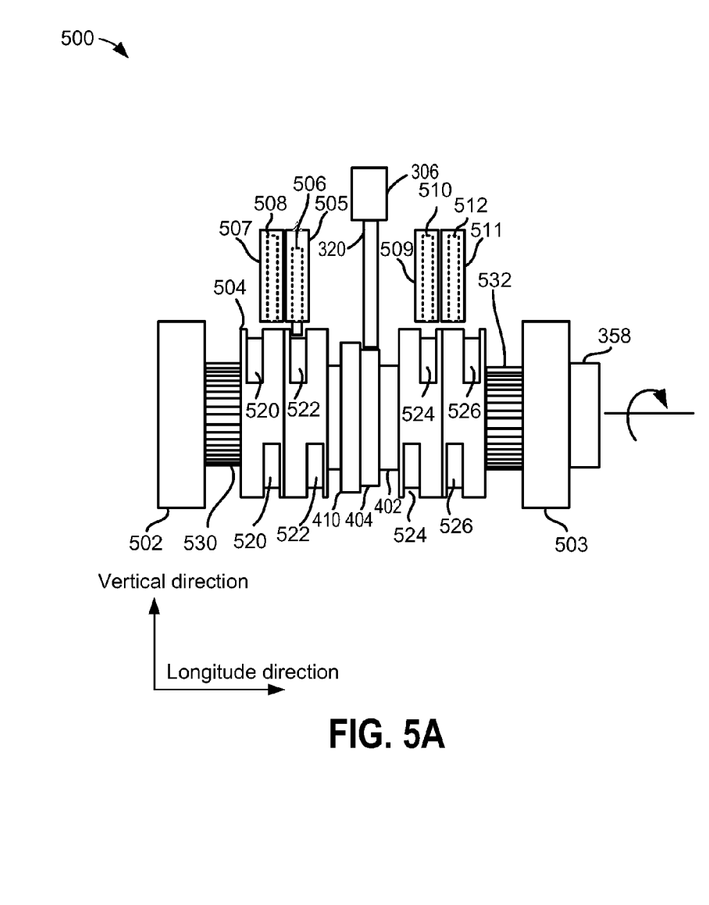
FIGS. 5A-5B show an example high pressure direct injection fuel pump actuator.
Figure 5B:
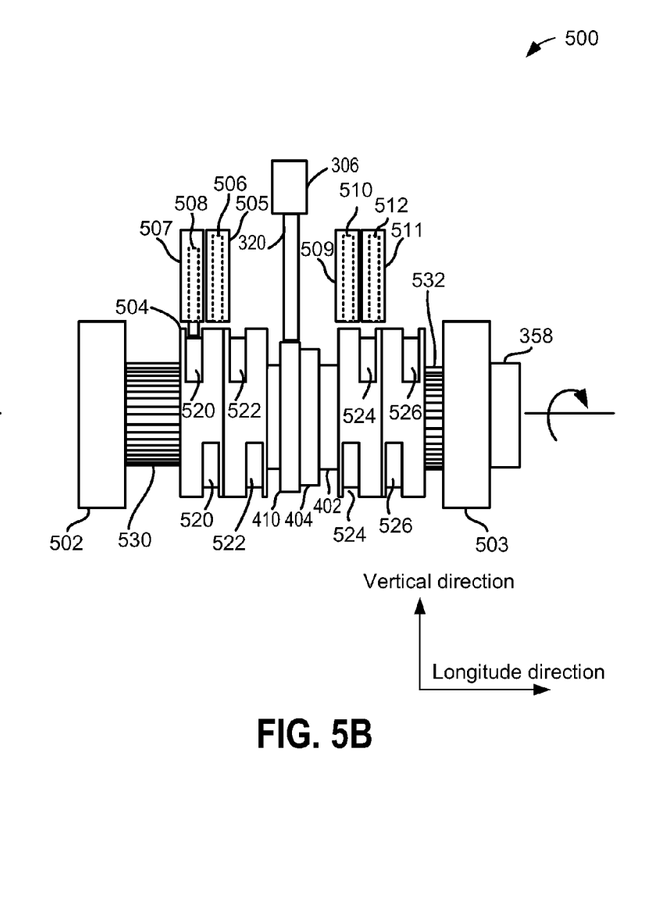
Figure 6:
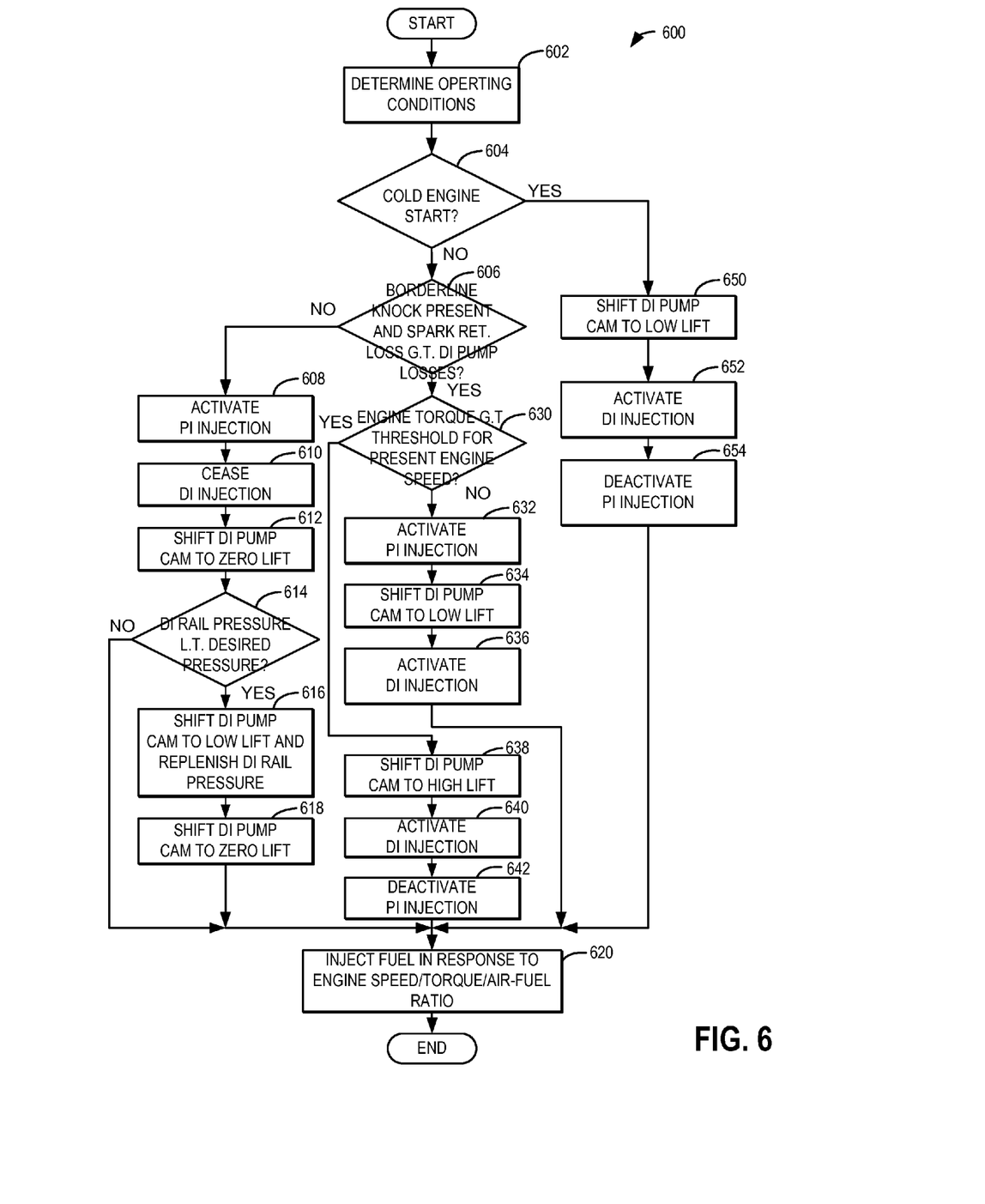
FIG. 6 shows an example flow chart of a method for operating a high pressure direct injection fuel pump.

The following disclosure relates to methods and systems for operating a direct injection fuel pump, such as the system of FIGS. 1-2 and 4-5B. The fuel system may deliver fuel to a combustion engine, such as the engine of FIG. 1. The fuel system may be constructed as shown in FIG. 2. FIG. 3 shows an example prior art fuel pump that may have issues when it is deactivated. A fuel pump according to the present description is shown in FIG. 4. FIGS. 5A and 5B show detailed views of an example fuel pump actuator that varies direct injection fuel pump piston lift. FIG. 6 shows a method for operating a direct injection fuel pump in the systems of FIGS. 1-2 and 4-5B.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 including a turbocharger having a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. In one example, actuator 152 is a camshaft including cam lobes. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some examples, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted. In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Controller 12 is shown in FIG. 1 as a microcomputer, including microprocessor unit 106, input/output ports 108, an electronic storage medium for non-transitory executable programs and calibration values shown as non-transitory read only memory 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

FIG. 2 schematically depicts an example fuel system 8 of FIG. 1. Fuel system 8 may be operated to deliver fuel to an engine, such as engine 10 of FIG. 1. Fuel system 8 can provide fuel to an engine from fuel tank 202. As a specific non-limiting example, the fuel type in the fuel tank may solely include gasoline or the fuel type may be a combination of gasoline and ethanol. Fuel may be provided to fuel tank 202 via fuel filling passage 204. A low pressure fuel pump (LPP) 208 in communication with fuel tank 202 may be operated to supply fuel from the fuel tank 202 to a first group of port injectors 242, via a first fuel passage 230. In one example, fuel pump 208 may be an electrically-powered lower pressure fuel pump disposed at least partially within fuel tank 202. Fuel lifted by fuel pump 208 may be supplied at a lower pressure into a first fuel rail 240 coupled to one or more fuel injectors of first group of port injectors 242 (herein also referred to as first injector group). While first fuel rail 240 is shown dispensing fuel to four fuel injectors of first injector group 242, it will be appreciated that first fuel rail 240 may dispense fuel to any suitable number of fuel injectors. As one example, first fuel rail 240 may dispense fuel to one fuel injector of first injector group 242 for each cylinder of the engine. Fuel pressure in fuel rail 240 is determined via pressure sensor 238. Note that in other examples, first fuel passage 230 may provide fuel to the fuel injectors of first injector group 242 via two or more fuel rails. For example, where the engine cylinders are configured in a V-type configuration, two fuel rails may be used to distribute fuel from the first fuel passage to each of the fuel injectors of the first injector group.

Direct injection fuel pump 228 that is included in second fuel passage 232 and it is supplied fuel via LPP 208. In one example, direct injection fuel pump 228 may be a mechanically-powered positive-displacement pump. Direct injection fuel pump 228 may be in communication with a group of direct injectors 252 via a second fuel rail 250. Thus, lower pressure fuel lifted by first fuel pump 208 may be further pressurized by direct injection fuel pump 228 so as to supply higher pressure fuel for direct injection to second fuel rail 250 coupled to one or more direct fuel injectors 252 (herein also referred to as second injector group). In some examples, a fuel filter (not shown) may be disposed upstream of direct injection fuel pump 228 to remove particulates from the fuel. Further, in some examples a fuel pressure accumulator (not shown) may be coupled downstream of the fuel filter, between the low pressure pump and the high pressure pump. Fluid communication between first fuel passage 230 and second fuel passage 232 is achieved through passage 302.

The various components of fuel system 8 communicate with an engine control system, such as controller 12. For example, controller 12 may receive an indication of operating conditions from various sensors associated with fuel system 8 in addition to the sensors previously described with reference to FIG. 1. The various inputs may include, for example, an indication of an amount of fuel stored in fuel storage tank 202 via fuel level sensor 206.

Controller 12 can also control the operation of each of fuel pumps 208 and 228 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 12 may be used to send a control signal to the low pressure pump, as required, to adjust the output (e.g. speed) of the low pressure pump. The amount of fuel that is delivered to the group of direct injectors via the direct injection pump may be varied by adjusting and coordinating the output of the LPP and the direct injection pump. For example, the lower pressure fuel pump and the higher pressure fuel pump may be operated to maintain a prescribed fuel rail pressure. A fuel rail pressure sensor 248 coupled to the second fuel rail may be configured to provide an estimate of the fuel pressure available at the group of direct injectors. Further, the pump outputs may be adjusted based on a difference between the estimated rail pressure and a desired rail pressure. In one example, controller 12 may vary direct injection fuel pump piston travel by adjusting cam lift in response to a desired direct fuel injection fuel rail pressure. Additionally, controller 12 may adjust the output of direct injection fuel pump 228 via adjusting a flow control valve of direct injection pump 228. Direct injection pump may stop providing fuel to fuel rail 250 during selected conditions such as during vehicle deceleration or while the vehicle is traveling downhill. Further, during vehicle deceleration or while the vehicle is traveling downhill, one or more direct fuel injectors 252 may be deactivated.

FIG. 3 shows a prior art example direct injection fuel pump. Inlet 303 of direct injection fuel pump compression chamber 308 is supplied fuel via a low pressure fuel pump. The fuel may be pressurized upon its passage through direct injection fuel pump 228 and supplied to a fuel rail through pump outlet 304. In the depicted example, the direct injection pump may be a mechanically-driven displacement pump that includes an injection pump cylinder 350, injection pump piston 306, injection pump piston rod 320, a pump compression chamber 308 (herein also referred to as compression chamber), and a step-room 318. Injection pump piston 306 includes a top 305 and a bottom 307. The step-room and compression chamber may include cavities positioned on opposing sides of the pump piston. In one example, the injection pump piston 306 in direct injection pump 228 is driven by cam lobe 310 via rod 320. Cam 310 includes four lobes and completes one rotation for every two engine crankshaft rotations. In other examples, cam 310 may have fewer lobes. Cam lobe 310 rotates as direct injection drive shaft 358 rotates.

Direct injection drive shaft 358 may be driven via engine crankshaft 140 or engine camshaft 152.

A solenoid activated inlet check valve 312 may be coupled to pump inlet 303. Controller 12 may be configured to regulate fuel flow through inlet check valve 312 by energizing or de-energizing the solenoid valve (based on the solenoid valve configuration) in synchronism with the driving cam. Accordingly, solenoid activated inlet check valve 312 may be operated in two modes. In a first mode, solenoid activated check valve 312 is positioned within inlet 303 to limit (e.g. inhibit) the amount of fuel traveling upstream of the solenoid activated check valve 312. In comparison, in the second mode, solenoid activated check valve 312 is effectively disabled and fuel can travel upstream and downstream of inlet check valve.

As such, solenoid activated check valve 312 may regulate the mass of fuel compressed into the direct injection fuel pump. However, using electrical current to adjust solenoid activated check valve 312 may reduce engine fuel economy. In one example, controller 12 may adjust a closing timing of the solenoid activated check valve to regulate the mass of fuel compressed. For example, a late inlet check valve closing may reduce the amount of fuel mass ingested into the compression chamber 308. The solenoid activated check valve opening and closing timings may be coordinated with respect to stroke timings of the direct injection fuel pump. By continuously throttling the flow into the direct injection fuel pump from the low pressure fuel pump, fuel may be ingested into the direct injection fuel pump without requiring metering of the fuel mass.

Pump inlet 399 allows fuel to solenoid operated check valve 312 so that solenoid operated check valve 312 may adjust the amount of fuel being pumped so as to regulate fuel pressure in the high pressure fuel rail. Injection pump piston 306 reciprocates up and down in cylinder 350. Accumulator 309 is shown near inlet 399. Direct fuel injection pump 228 is in a compression stroke when piston 306 is traveling in a direction that reduces the volume of compression chamber 308. Direct fuel injection pump 228 is in a suction stroke when injection pump piston 306 is traveling in a direction that increases the volume of compression chamber 308.

A forward flow outlet check valve 316 may be coupled downstream of an outlet 304 of the compression chamber 308. Outlet check valve 316 opens to allow fuel to flow from the compression chamber outlet 304 into a fuel rail only when a pressure at the outlet of direct injection fuel pump 228 (e.g., a compression chamber outlet pressure) is higher than the fuel rail pressure. Thus, during conditions when direct injection fuel pump operation is not requested, controller 12 may deactivate solenoid activated inlet check valve 312.

FIG. 4 shows an example of a direct injection fuel pump 228 according to the present description. Many devices and/or components in the direct injection fuel pump of FIG. 4 are the same as devices and/or components shown in FIG. 3. Therefore, for the sake of brevity, devices and components that are common with the direct fuel injection pump of FIG. 3 and that are included in the direct injection fuel pump of FIG. 4, are labeled the same and the description of these devices and components is omitted.

Direct injection fuel pump 228 includes an optional solenoid activated check valve 312. Solenoid operated check valve 312 may adjust an amount of fuel entering compression chamber 308 when any of cam lobe profiles 402, 404, and 410 are activated. Controller 12 may activate any one of cam lobe lift profiles 402, 404, and 410 in response to engine operating conditions. Cam lobe lift profile 402 is a zero lift profile that does not cause injection pump piston 306 to reciprocate. Cam lobe lift profile 404 is a low lift profile that causes piston 306 to reciprocate in injection pump cylinder 350. Direct injection fuel pump 228 may operate to provide a first range of pressures to a direct injection fuel rail when low lift cam profile 404 is activated. Cam lobe lift profile 410 is a high lift profile that causes injection pump piston 306 to reciprocate in injection pump cylinder 350. Direct injection fuel pump 228 may operate to provide a second range of pressures to a direct injection fuel rail when high lift profile 404 is activated, the second range of pressures greater than the first range of pressures. Pressure in compression chamber 308 reaches a higher pressure when high lift cam profile 410 is activated as compared to when low lift cam profile 404 is activated and while solenoid operated check valve is operated substantially the same between the two lift profiles.

Referring now to FIG. 5A, an example high pressure direct injection fuel pump actuator is shown. Direct injection fuel pump actuator 500 includes a direct injection pump drive shaft 358. In one example, camshaft 152 shown in FIG. 1 drives direct injection pump drive shaft 358 such that direct injection pump drive shaft 358 rotates once for each engine revolution. Alternatively, direct injection pump drive shaft 358 may be driven via the engine crankshaft.

Direct injection pump drive shaft 358 rotates within bearings (not shown) and is supported by bearing supports 502 and 503. Splines 530 and 532 run in the longitudinal direction of direct injection pump drive shaft 358. Cam profile sleeve 504 covers a portion of direct injection pump drive shaft 358 and it includes splines on its inner diameter (not shown) for engaging splines 530 and 532. Cam profile sleeve 504 also includes displacing channels 520, 522, 524, and 526. Actuators 505, 507, 509, and 511 include actuator pins 506, 508, 510, and 512 for engaging displacing channels 520, 522, 524, and 526.

Displacing channel 526 activates zero lift cam lobe profile 402 when actuator pin 512 is radially engaged to displacing channel 526 during rotation of pump drive shaft 358. Actuator pin 512 remains stationary as cam profile sleeve 504 rotates with direct injection pump drive shaft 358 so that the path of displacing channel 526 causes cam profile sleeve 504 to move longitudinally along the length of cam profile sleeve 504 as pump drive shaft 358 rotates.

Displacing channel 522 activates low lift cam lobe profile 404 when actuator pin 506 is radially engaged to displacing channel 522 during rotation of pump drive shaft 358. Actuator pin 506 remains stationary as cam profile sleeve 504 rotates with direct injection pump drive shaft 358 so that the path of displacing channel 522 causes cam profile sleeve 504 to move longitudinally along the length of cam profile sleeve 504 as pump drive shaft 358 rotates. In this example, actuator pin 506 is shown engaging displacing channel 522 to activate low lift cam profile 404.

Displacing channel 520 activates high lift cam lobe profile 410 when actuator pin 508 is radially engaged to displacing channel 520 during rotation of pump drive shaft 358. Actuator pin 508 remains stationary as cam profile sleeve 504 rotates with direct injection pump drive shaft 358 so that the path of displacing channel 520 causes cam profile sleeve to move longitudinally along the length of cam profile sleeve 504 as pump drive shaft 358 rotates.

Displacing channel 524 allows cam profile sleeve 504 to shift from high lift cam lobe profile 410 to low lift cam profile 404 when actuator pin 510 is radially engaged to displacing channel 524 during rotation of pump drive shaft 358. Actuator pin 510 remains stationary as cam profile sleeve 504 rotates with direct injection pump drive shaft 358 so that the path of displacing channel 524 causes cam profile sleeve to move longitudinally along the length of cam profile sleeve 504 as pump drive shaft 358 rotates.

Cam lobe profiles 410, 404, and 402 may include four, two, or zero cam lobes to lift injection pump piston rod 320 during engine rotation. Additionally, fewer or greater numbers of cam lobe profiles may be provided depending on the desired range of injection pump pressures.

Thus, cam profile sleeve may traverse back and forth in a longitudinal direction along pump drive shaft 358 to provide different amounts of lift to fuel injection pump piston 306. If higher fuel rail pressures are desired, cam profile sleeve may be adjusted to operate injection pump piston rod 320 via cam lobe lift profile 410. If it is desired to deactivate the direct injection fuel pump, cam profile sleeve may be adjusted to engage injection pump piston rod 320 and zero lift cam lobe profile 402.

Referring now to FIG. 5B, an alternative operating state of the high pressure direct injection fuel pump actuator described in FIG. 5A is shown. All the components of direct injection fuel pump actuator 500 shown in FIG. 5A are shown in FIG. 5B. Further, the components are labeled with the same identification labels. Therefore, for the sake of brevity the description of the previously described components is omitted.

FIG. 5B shows direct injection fuel pump actuator in a state where high lift cam profile 410 is activated so as to provide lift to direct injection pump piston rod 320 and injection pump piston 306. It may be observed that less of spline 530 is visible as compared to the view shown in FIG. 5A. Further, an additional amount of spline 532 is visible as compared to the view shown in FIG. 5B. Thus, in FIG. 5B, cam profile sleeve 520 is shown shifted longitudinally in a direction to the left of where it is shown in FIG. 5A. The cam profile sleeve 520 is adjusted to the left via engaging actuator pin 508 into displacing channel 520. Actuator pins 506, 508, 510, and 512 remain in stationary positions relative to pump drive shaft 358. Direct injection pump piston rod 320 and injection pump piston 306 also remain stationary with respect to pump drive shaft 358.

It should be noted that displacing channels 520-526 start and end as shown in FIGS. 5A and 5B partially spiraling around the cam profile sleeve 520. Further, displacing channels 520 and 522 are mirror images of displacing channels 524 and 526. Thus, the combination of FIGS. 5A and 5B show how a cam profile sleeve translates across pump drive shaft 358 and adjusts a direct injection pump piston lift amount.

Thus, the system of FIGS. 1-2 and 4-5B provides for a direct injection fuel pump system, comprising: a direct injection fuel pump including a piston, a driveshaft, a cam profile sleeve fitted over the driveshaft, and an actuator pin. The direct injection fuel pump system includes where the cam profile sleeve includes at least two cam lobe profiles. The direct injection fuel pump system includes where one of the at least two cam lobe profiles is a zero lift cam lobe profile. The direct injection fuel pump system also includes where the cam profile sleeve includes a displacing channel. The direct injection fuel pump system further comprises a controller including non-transitory instructions for deploying the actuator pin into the displacing channel. The direct injection fuel pump system further comprises a controller including non-transitory instructions for adjusting a position of the cam profile sleeve in response to a direct injection fuel rail pressure.

Referring now to FIG. 6, a method for operating a high pressure direct injection fuel pump is shown. The method of FIG. 6 may be implemented via executable instructions stored in non-transitory memory of a controller. Further, the controller may be part of a system as is described in FIGS. 1-2 and 4-5B.

At 602, method 600 determines operating conditions. Operating conditions may include but are not limited to engine speed, engine torque demand, engine temperature, vehicle speed, ambient temperature, and direct injection fuel rail pressure. Method 600 proceeds to 604 after method 600 determines engine operating conditions.

At 604, method 600 judges whether or not the engine is being cold started. In one example, method 600 may judge that the engine is being cold started when the engine has stopped rotating for a predetermined amount of time and engine coolant temperature is less than a threshold temperature. If method 600 judges that the engine is being cold started, the answer is yes and method 600 proceeds to 650. Otherwise, the answer is no and method 600 proceeds to 606.

At 650, method 600 shifts the direct injection fuel pump cam profile to the low lift cam lobe profile. Alternatively, method 600 may shift the direct injection fuel pump cam profile to the high lift cam lobe profile. If higher injection pressures are desired during engine starting, the high lift cam lobe profile is selected. If lower injection pressures are desired during engine starting, the lower lift cam lobe profile is selected. The lower or high lift cam lobe profile is selected by adjusting a position of a cam profile sleeve that includes the lower and higher cam lift profile. The cam profile position is adjusted to move relative to pump piston rod 320 and the injection pump piston 306 in a direction longitudinal to pump drive shaft 358 as shown in FIGS. 5A and 5B. Method 600 proceeds to 652 after the direct injection pump is shifted to a desired cam lift profile.

At 652, method 600 activates direct injection (DI). Direct injection may be activated via enabling fuel flow through injectors injecting fuel directly into engine cylinders. In some examples, operation of direct injectors may be delayed until fuel pressure in the direct injection fuel rail has reached a minimum pressure. Method 600 proceeds to 654 after the direct fuel injectors are activated.

At 654, method 600 deactivates port fuel injection. Port fuel injection may be deactivated via holding port fuel injectors in a closed state. However, the low pressure fuel pump may continue to operate and provide fuel from the fuel tank to the direct injection fuel pump. The port fuel injectors may be deactivated during engine starting to take advantage of improved fuel vaporization when injecting fuel directly to engine cylinders during engine starting. In this way, engine emissions and engine starting robustness may be improved. Method 600 proceeds to 620 after deactivating port fuel injectors.

At 620, method 600 injects fuel in response to engine speed, engine torque demand, and a desired engine air-fuel ratio. If fuel is injected solely via direct injectors, timing of direct injectors is adjusted in response to engine speed, engine air-fuel ratio, and the engine torque demand. If fuel is injected solely via port injectors, timing of port injectors is adjusted in response to engine speed, engine air-fuel ratio, and the engine torque demand. If fuel is injected via port injectors and direct injectors, a portion of the total amount of fuel injected to a cylinder during a cylinder cycle is supplied by the direct injectors, and the remaining amount of fuel delivered during the cylinder cycle is delivered via direct injectors. The proportion of fuel delivered between port and direct injectors may be varied according to engine speed and torque as well as other operating conditions. Method 600 proceeds to exit after fuel is injected to the engine.

At 606, method 600 judges whether or not borderline engine knock is detected and if fuel economy losses of retarding spark to control borderline knock are greater than fuel economy gains of stopping the direct injection fuel pump. If so, the answer is yes and method 600 proceeds to 630. Otherwise, the answer is no and method 600 proceeds to 608. Thus, method 600 allows port fuel injection when there is no borderline knock and when borderline spark is present and may be constrained via spark retard that impacts engine fuel economy less than activating the direct injection fuel pump.

At 608, method 600 activates port fuel injectors. Port fuel injectors are activated by allowing fuel to flow through the port fuel injectors. Specifically, voltage is selectively applied to the port fuel injectors so that fuel may be supplied to the intake ports of cylinders. Method 600 proceeds to 610 after the port fuel injectors are activated.

At 610, method 600 ceases to inject fuel via direct injectors. Fuel flow through direct injectors may be stopped via not supplying voltage to the direct injectors. Method 600 proceeds to 612 after fuel flow through the direct injectors is deactivated.

At 612, method 600 adjusts the direct fuel injection pump to a zero lift cam lobe profile (e.g., profile 402 in FIGS. 4 and 5A). Adjusting the direct fuel injection pump to a zero lift cam profile allows the engine and direct injection pump driver shaft to rotate while the direct injection fuel pump piston remains stationary. Consequently, the direct injection fuel pump piston and cylinder may not require lubrication. Further, the direct fuel injection pump does not have to compress fuel entering the direct injection fuel pump compression chamber. Additionally, current and voltage supplied to a solenoid activated inlet check valve is ceased or stopped to reduce electrical consumption. In this way, the direct injection fuel pump may be temporarily deactivated to conserve electrical energy and reduce mechanical work. Method 600 proceeds to 614 after the direct injection fuel pump is deactivated.

At 614, method 600 judges whether or not pressure in a direct injection fuel rail is less than a threshold pressure. If so, the answer is yes and method 600 proceeds to 616. Otherwise, the answer is no and method 600 proceeds to 620. By judging whether direct injector fuel rail pressure is than a threshold pressure, method 600 may maintain direct injector fuel rail pressure greater than a threshold pressure so that direct fuel injectors may open and supply fuel to engine cylinders on short notice without having to wait until direct fuel injector rail pressure reaches a threshold pressure.

At 616, method 600 shifts the direct injection pump cam profile sleeve to a low lift profile as described at 652. Further, method 600 supplies electrical current and voltage to the solenoid activated inlet check valve (e.g., element 312 in FIG. 4) to adjust the amount of fuel to be pumped by the direct injection fuel pump. Method 600 operates the direct injection fuel pump via the lower lift profile and the solenoid activated inlet check valve until the direct injection fuel rail pressure reaches the desired pressure. Method 600 proceeds to 618 after the direct injection fuel rail reaches the desired pressure.

At 618, method 600 adjusts the direct injection pump to a zero lift cam lobe profile as described at 612. By deactivating the direct fuel injection pump after direct injection fuel rail pressure reaches a threshold pressure, method 600 may reduce energy consumption by the direct injection fuel pump at the same time of maintaining direct injection fuel rail pressure. Method 600 proceeds to 620 after the direct fuel injection pump is temporarily deactivated.

At 630, method 600 judges whether or not engine torque is greater than a torque threshold at the present engine speed. In other examples, method 600 may judge whether or not other conditions are present to determine whether fuel is injected solely via port injectors or via port and direct injectors after borderline knock is detected. If method 600 judges that engine torque is greater than the threshold torque, the answer is yes and method 600 proceeds to 638. Otherwise, the answer is no and method 600 proceeds to 632.

At 632, method 600 activates port fuel injection as described at 608. Method 600 proceeds to 634 after port fuel injection is activated.

At 634, method 600 shifts the direct injection fuel pump cam profile to the low lift cam lobe profile as described at 650. Method 600 proceeds to 636 after the direct fuel injection pump cam profile is shifted to a lower lift profile.

At 636, method 600 activates direct injection as described at 652. Method 600 proceeds to 620 after direct injection is activated. Thus, after 630, method 600 activates both port and direct fuel injection to supply fuel to the engine.

At 638, method adjusts the direct injection fuel pump to cam profile to a high lift cam profile. Method 600 adjusts the direct injection fuel pump cam profile to a high lift cam profile via engaging actuator pins to one or more displacing channels as is described in FIGS. 5A and 5B. As the engine rotates, the direct injection cam lobe profiles may be switched from a low lift cam profile to a high lift cam profile or from a zero lift cam profile to the high lift cam profile. By shifting the direct injection fuel pump to the high lift profile, method 600 may increase direct injection pump output to increase direct injection fuel rail pressure. Method 600 proceeds to 640 after the direct injection fuel pump is shifted to the high lift cam lobe profile.

At 640, method 600 activates direct fuel injection as described at 652. Method 600 proceeds to 642 after direct fuel injection is activated.

At 642, method 600 deactivates port fuel injection as described at 654. Method 600 proceeds to 620 after port fuel injection is deactivated.

In this way, method 600 may adjust between different cam lobe profiles based on operating conditions to reduce engine fuel consumption while maintaining the engine in a state of preparedness. Further, method 600 may reduce direct fuel injection pump wear during conditions of direct fuel injection pump deactivation.

Thus, the method of FIG. 6 provides for a method of operating a direct injection fuel pump, comprising: during a first condition, operating a direct injection fuel pump with a first piston lift amount; and during a second condition, the second condition different from the first condition, operating the direct injection fuel pump with a second piston lift amount, the second piston lift amount greater than the first lift amount. The method includes where the first condition is a first engine load, where the second condition is a second engine load, and where the second engine load is greater than the first engine load.

In some examples, the method further comprises operating the direct injection fuel pump with a third piston lift amount, the third piston lift amount greater than the second piston lift amount, the third piston lift amount activated during a third condition, the third condition different from the first and second conditions. The method includes where the first piston lift amount is substantially zero lift over an engine cycle. The method further comprises transitioning between the first piston lift amount and the second piston lift amount via adjusting a position of a first lift cam and a second lift cam longitudinally along a direct fuel injection pump drive shaft. The method includes where the first lift cam and the second lift cam are adjusted via radially engaging an actuator pin into a displacing channel. The method includes where the displacing channel is formed in a cam sleeve.

In another example, the method of FIG. 6 provides for a method of operating a direct injection fuel pump, comprising: adjusting a cam profile sleeve lifting a fuel pump piston in response to engine operating conditions, the cam profile sleeve adjusted via shifting the cam profile sleeve's position longitudinally along a direct injection fuel pump drive shaft. The method includes where the cam profile sleeve includes a first lift cam lobe profile and a second lift cam lobe profile. In some examples, the method includes where the first cam lobe lift profile is a zero lift cam lobe profile and where the second lift cam lobe profile is a low lift cam lobe profile. The method includes where the cam profile sleeve further comprising a third lift cam lobe profile, and where the third lift cam lobe profile is a high lift cam lobe profile. The method includes where the zero lift cam lobe profile is activated to deactivate the direct injection fuel pump. The method further comprises transitioning from the zero lift cam lobe profile to the low lift cam lobe profile in response to direct injection fuel rail pressure. The method includes where a position of the cam profile sleeve is adjusted via engaging an actuator pin.

Note that the example control and estimation methods included herein can be implemented as executable instructions stored in non-transitory memory and used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a direct injection fuel pump, comprising:
    in response to engine knock,
    during a first condition where the first condition is a first engine load, operating the direct injection fuel pump with a first piston lift amount;
    during a second condition where the second condition is a second engine load greater than the first engine load, the second condition different from the first condition, operating the direct injection fuel pump with a second piston lift amount, the second piston lift amount greater than the first lift amount;
    in the absence of engine knock, deactivating the direct injection fuel pump; and
    activating the direct injection fuel pump from a deactivated state via engaging a low lift cam profile in response to fuel pressure less than a threshold in a fuel rail supplied fuel by the direct injection fuel pump while direct fuel injectors coupled to the fuel rail are deactivated in response to the absence of engine knock.

2. The method of claim 1, further comprising operating the direct injection fuel pump with a third piston lift amount, the third piston lift amount greater than the second piston lift amount, the third piston lift amount activated during a third condition, the third condition different from the first and second conditions.

3. The method of claim 1, where the direct injection fuel pump is deactivated via putting a zero lift cam profile in mechanical communication with the direct injection fuel pump over an engine cycle.

4. The method of claim 1, further comprising transitioning between the first piston lift amount and the second piston lift amount via adjusting a position of a first lift cam and a second lift cam longitudinally along a direct injection fuel pump drive shaft.

5. The method of claim 4, where the first lift cam and the second lift cam are adjusted via radially engaging an actuator pin into a displacing channel.

6. The method of claim 5, where the displacing channel is formed in a cam sleeve.

7. A method of operating a direct injection fuel pump, comprising:
    adjusting a cam profile sleeve lifting a fuel pump piston in response to an engine operating condition, the cam profile sleeve adjusted via shifting a position of the cam profile sleeve longitudinally along a direct injection fuel pump drive shaft, the cam profile sleeve adjusted between a position providing a zero lift cam lobe profile over an engine cycle and a low lift cam lobe profile, where the cam profile sleeve includes a first lift cam lobe profile and a second lift cam lobe profile, and where the engine operating condition is an indication of borderline engine knock, where the first lift cam lobe profile is the zero lift cam lobe profile and where the second lift cam lobe profile is the low lift cam lobe profile, and where a piston of the direct injection fuel pump is stationary over the engine cycle as the direct injection fuel pump drive shaft rotates, and where the zero lift cam lobe profile is activated to deactivate the direct injection fuel pump; and
    transitioning from the zero lift cam lobe profile to the low lift cam lobe profile in response to direct injection fuel rail pressure in a fuel rail supplied fuel by the direct injection fuel pump when direct fuel injectors are deactivated.

8. The method of claim 7, where the cam profile sleeve further comprises a third lift cam lobe profile, and where the third lift cam lobe profile is a high lift cam lobe profile.

9. The method of claim 7, where the position of the cam profile sleeve is adjusted via engaging an actuator pin.

\* \* \* \* \*